United States Patent [19]

Danko

[11] 4,161,506
[45] Jul. 17, 1979

[54] METHOD OF FORMING FINISHING WELTS

[75] Inventor: Edward M. Danko, Detroit, Mich.

[73] Assignee: Color Custom Compounding, Inc., Warren, Mich.

[21] Appl. No.: 849,915

[22] Filed: Nov. 9, 1977

Related U.S. Application Data

[62] Division of Ser. No. 724,815, Sep. 20, 1976, Pat. No. 4,093,773.

[51] Int. Cl.² .......................... B29F 3/10; B29C 17/00
[52] U.S. Cl. ................................ 264/174; 264/177 R; 264/284
[58] Field of Search ........... 264/174, 284, 293, 177 R, 264/149

[56] References Cited

U.S. PATENT DOCUMENTS

| | | | |
|---|---|---|---|
| 1,956,575 | 5/1934 | Hinsky | 264/174 |
| 2,958,909 | 11/1960 | Bradley et al. | 264/284 |
| 3,616,147 | 10/1971 | Ambrose | 428/365 |
| 3,652,374 | 3/1972 | Condon | 428/296 |
| 3,882,207 | 5/1975 | Hannan et al. | 264/284 |
| 4,050,867 | 9/1977 | Ferrentino et al. | 264/174 |

Primary Examiner—James B. Lowe

Attorney, Agent, or Firm—Cullen, Sloman, Cantor, Grauer, Scott and Rutherford

[57] ABSTRACT

A finishing welt, comprised of a reinforcing polyethylene rod surrounded by a fabric scrim and an outer encasing layer of polyvinyl chloride, is formed in an extrusion-embossment method and apparatus.

The method includes feeding a composite preform, consisting of the polyethylene rod and the scrim, first through an essentially key-hole shaped passageway in a core pin of an extruder crosshead and then into a chamber within the crosshead where plastic material under pressure flows onto the preform. Immediately thereafter, the preform is conveyed through an essentially key-hole shaped orifice, where the welt is formed by extrusion. Next, the opposed sides of the welt are sequentially embossed as the welt is conveyed over external peripheral embossing surfaces of two spaced rollers.

The resultant welt is essentially key-hole shaped in cross-section, with the scrim surrounding the rod within the enlarged head portion of the welt and extending into the smaller depending flange portion. As a result of the extrusion step, the outer encasing layer of polyvinyl chloride is bonded through the scrim in the welt flange; and as a result of the sequential embossment, the outer surface of the welt is free of any significant longitudinal rib.

5 Claims, 8 Drawing Figures

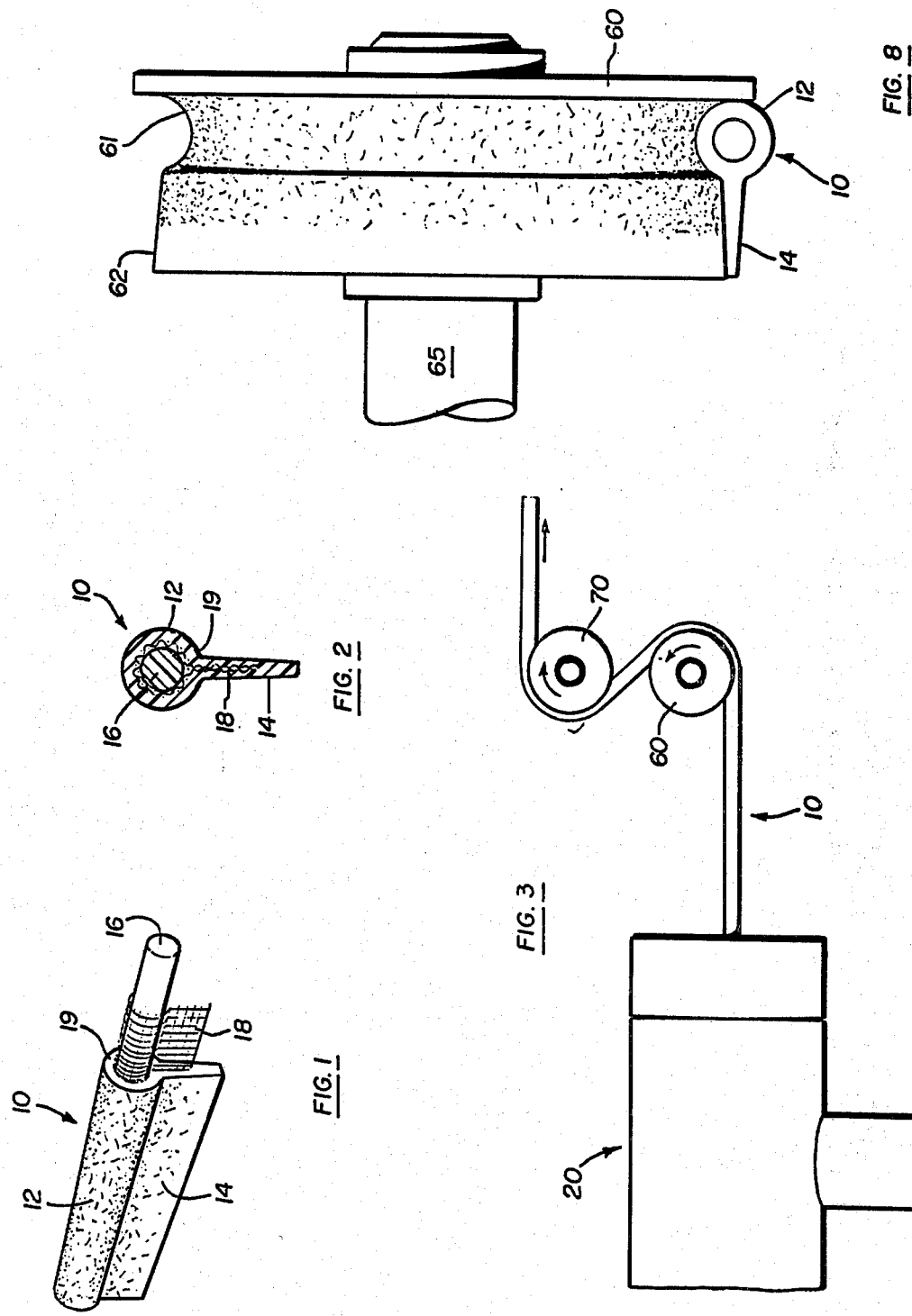

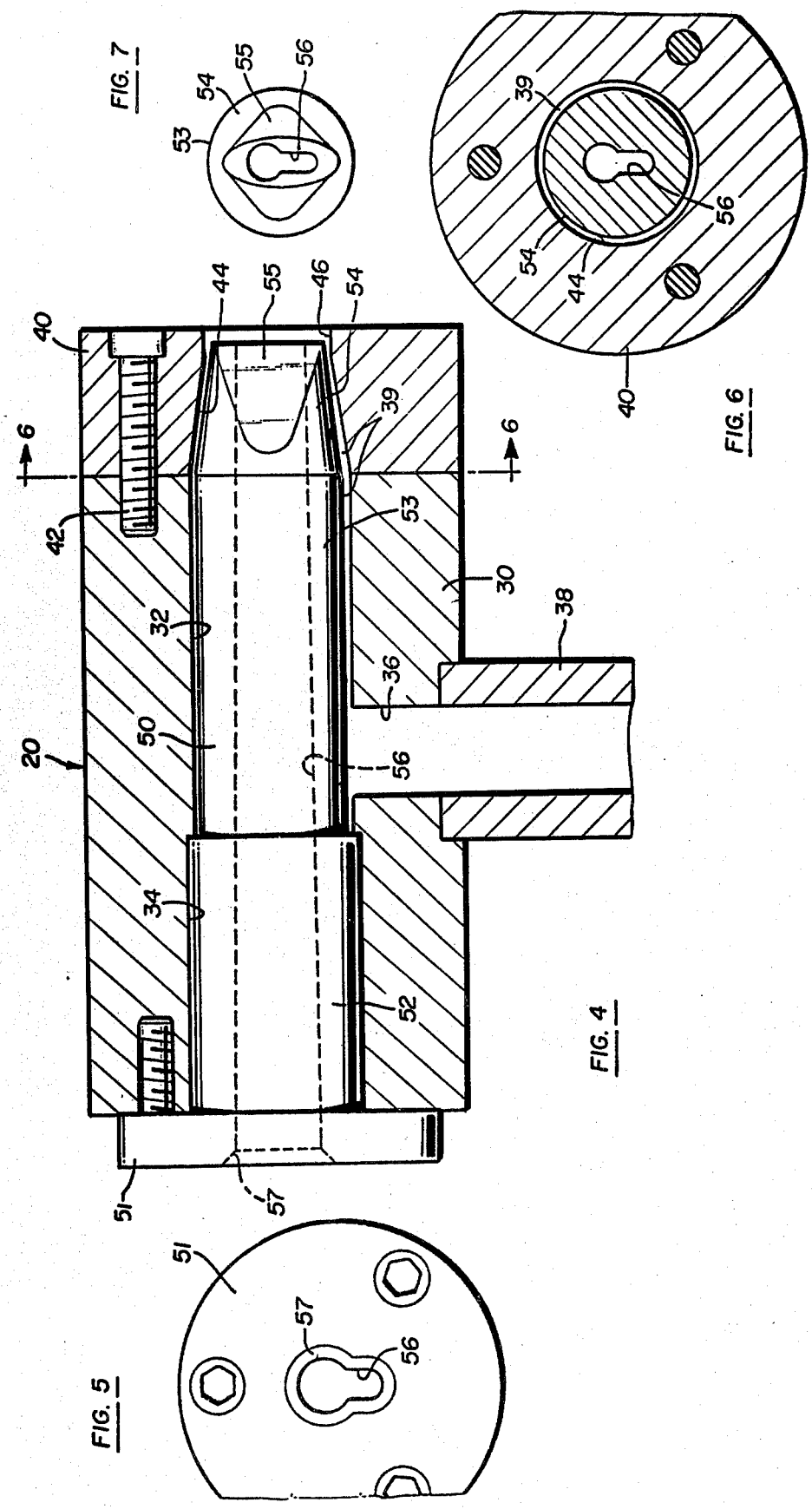

METHOD OF FORMING FINISHING WELTS

This is a divisional of application Ser. No. 724,815, filed Sept. 20, 1976 now U.S. Pat. No. 4,093,773.

BACKGROUND OF THE INVENTION

1. Field of the Invention

Very generally, the present invention relates to a method of forming a finishing welt for use in upholstery, such as in automobiles. More specifically, the welt is formed by extrusion and then embossed in two separate, sequential embossing operations to form a grained appearance on its exterior surface.

2. The Prior Art

Finishing welts made of plastic materials are now quite commonly used in automotive interiors to join the edges of two adjacent upholstery panels. Typically, such welts include a bead portion to provide a decorative appearance at the line of upholstery juncture and a flange to which the upholstery panels are sewn or otherwise attached. With the welts serving these functions, it is desirable that the bead be embossed with a grain appearance and that the flange be reinforced. Additionally, it is desirable to provide the welt bead with an inner reinforcement for extended durability.

Prior methods of making welts have experienced various undesirable shortcommings or disadvantages, which have been solved by the present invention.

For example, one prior method of embossing a welt included passing the welt bead simultaneously through two adjacent graining rollers. This method, while achieving the grained appearance, is undesirable because it forms a longitudinal non-grained rib on the welt bead at the line of contact between the two rollers.

A second prior art method includes passing the welt beneath one graining roller, which flattens and embosses approximately one half of the welt bead, but leaves the other half of the bead around the flange ungrained. Obviously, this method is undesirable from a decorative standpoint.

A third prior art method of forming a welt has been highly successful at providing a grained appearance over the entire welt bead, but includes several other manipulative steps which may be eliminated by the present invention. This third method is disclosed in U.S. Pat. No. 2,958,909 and includes the steps of (a) extruding a substantially flat plastic preform having a raised segment destined to become the welt bead, (b) embossing the raised preform portion by a roller to provide the grained appearance, (c) bending the preform into the configuration of the welt and then (d) fusing the two portions of the welt flange together.

A fourth method of making a finishing welt involves simply adhering the component parts by an adhesive. In this method, the outer layer of plastic material is formed in a sheet and then embossed on one side. Subsequently, the sheet is cut into segments, which are adhesively secured to a fabric scrim. Thereafter, the adhered scrim and plastic segments are wrapped around a plastic rod and adhered by adhesive in the desired shape. This method is undesirable from at least two aspects: First, the manipulative adhering steps are both time-consuming and costly. Second, the scrim formed by this method is somewhat easily disassembled into its component parts, by virtue of its being held together only by an adhesive.

Thus, the prior art methods of forming welts are incapable of forming an integral welt including a reinforcing rod and scrim, wherein the entire welt bead is embossed and the plastic material is integrally bonded to and through the scrim in the welt flange.

The present invention overcomes these problems by extruding polyvinyl chloride material over a composite preform in a cross head extruder and then sequentially embossing the two opposed sides of the welt bead.

Of course, other prior art has previously suggested the formation of reinforced articles by extruding plastic material over one or more preforms, examples of such prior art being U.S. Pat. No. 3,697,209, 3,487,149, 3,899,384, 3,544,669, 2,422,281, and 3,375,550. However, none of these Patents suggest the overall method, apparatus, or product of this invention.

SUMMARY OF THE INVENTION

This disclosure relates to various inventive aspects which can be fully appreciated by the varying scope of the appended Claims. Specifically, this invention relates to a method of making a welt, including a method of sequentially embossing the sides of an arcuate portion of an extruded product.

More particularly, one aspect of this invention relates to a method of making a welt which is comprised of a generally cylindrical head portion integral with a depending tail portion. The outer surface of the plastic welt head includes an embossed grain appearance free of any substantial protruding rib, by virtue of having been formed in two separate stages by two spaced embossing surfaces.

In one of the method aspects of this invention, a composite preform, comprised of the reinforcing rod and fabric scrim, is fed through a keyhole shaped guide passage in a core pin of a cross head extruder. As the preform exits from the core pin within the extruder cross head, plastic material flows onto the preform and then the plastic-coated preform is extruded through a generally key-hole shaped orifice which is in general alignment with the similarly shaped passageway in the core pin.

Optionally, the outer surface of the welt may be embossed to provide a grained surface by conveying the extruded welt under tension over a roughened surface of a first roller, and thereby embossing slightly more than half of the outer surface of the welt head as the welt is conveyed around a portion of the roller periphery. Thereafter, the welt is conveyed away from the first roller and into engagement with the roughened surface of a second roller to emboss the other half of the welt. The two areas of roller-welt contact overlap, so that continuous graining is obtained without an unsightly non-grained rib or space.

Another independent aspect of this invention relates to the continuous embossment of the outer surface of an essentially cylindrical portion of an elongated plastic article by, first, conveying the plastic article away from an extrusion orifice under tension into engagement with two spaced, rotatable rollers having essentially identical annular, roughened embossing grooves. In this method, the opposed, essentially semi-cylindrical side surfaces of the article are sequentially embossed as one of the opposed semi-cylindrical surfaces is conveyed into engagement with the roughened embossing groove on the first roller and then as the other of the opposed semi-cylindrical surfaces is conveyed into engagement with the roughened embossing groove on the second roller.

Accordingly, the present invention provides several advantages over the prior art, especially a method for embossing the outer surface of an extruded arcuate product, without the formation of either an elongated, protruding rib or a non-embossed space.

These and other advantages and meritorious features will be more fully appreciated from the following detailed description and the appended claims.

BRIEF DESCRIPTION OF THE DRAWINGS

FIG. 1 is a perspective view, illustrating the component parts of the welt of this invention.

FIG. 2 is a cross sectional view of the welt formed by this invention, illustrating that the plastic encasing material is bonded through the scrim in the tail or flange region of the welt.

FIG. 3 is a schematic illustration of the extruder and the embossing rollers.

FIG. 4 is a partial cross sectional view, illustrating the components of the extruder cross head.

FIG. 5 is an end view of the core pin, illustrating the flared entry end of the key-hole configured guide passageway which extends throughout the length of the core pin.

FIG. 6 is a cross sectional view taken along plane 6—6 of FIG. 4.

FIG. 7 is a front view of the core pin, illustrating the tapered nose region and the exit region of the key-hole configured guide passageway.

FIG. 8 is a frontal view of one of the embossing rollers, illustrating the peripheral embossing groove within which the head portion of the welt is conveyed during the sequential embossing operation.

DETAILED DESCRIPTION OF THE PREFERRED EMBODIMENT

Referring now more particularly to the drawings, FIGS. 1 and 2 collectively illustrate the extruded welt of this invention, shown by reference numeral 10. The welt is generally key-hole configured and includes an enlarged bead or head 12 and a reduced tail or flange section 14. As can be seen, the interior of the welt is formed from a composite preform comprised of a reinforcing rod 16 and a reinforcing scrim 18. The rod is generally centrally located in the head portion of the welt and may be formed, for example, of one-eighth inch polyethylene rod stock. Other suitable rod stock, which has a higher melting temperature than the outer enclosing layer of extruded plastic and which is flexible, may also be used. The scrim provides a dual function of reinforcement and enhancing the bond with the outer extruded layer of thermoplastic material. As shown by both FIGS. 1 and 2, the scrim surrounds the rod in the welt head and extends down into the welt tail for reinforcement. Preferably, the scrim will be formed of either cotton or polyester. Optionally, the scrim may include a coating of a low-melt material, such as polyvinyl acetate, which is melted during the extrusion process in order to enhance the bond between the encasing plastic layer 19 and the preform. Such a coated fabric scrim may be obtained from Aucterlonie, Inc.

As discussed in greater detail below, the outer encasing layer of plastic material 19 is extruded over the composite preform and may be comprised of any suitable thermoplastic material, such as polyvinyl chloride. FIG. 2 shows that the outer encasing layer of this plastic material extends through the scrim in the welt tail, by virtue of the extrusion process, thus providing an integral bond particularly in this region which is resistant to separation of the welt article into the individual components.

Turning now to FIG. 3, an extruder cross head 20 is schematically illustrated, from which the welt 10 is extruded and then conveyed into sequential engagement with embossing rollers 60 and 70. From the rollers, the welt may optionally be conveyed to a water bath for cooling. As the welt is extruded from the cross head 20, it is generally in the configuration as shown in FIGS. 1 and 2, but without any embossment on the outer surface. The embossment is achieved by placing approximately one half of the outer surface of the welt in engagement with a roughened, embossed surface on roller 60, thereby embossing approximately one half of the welt. Thereafter, the other side or half of the welt is placed into engagement with a roughened, embossed surface of roller 70, thereby completing the embossment. By this method, each half of the welt may be embossed in separate stages to eliminate the formation of an elongated rib at the center, top portion of the welt head. Most preferably, the embossing step will be performed while the extruded product is still sufficiently deformable by virtue of the heat retained from the extrusion step.

In order to more specifically describe the extruder cross head 20, reference is now made more particularly to FIGS. 4–7, where the cross head is illustrated as being comprised primarily of an extruder housing 30, a die plate 40, and an elongated core pin 50.

The extruder housing 30 includes a first, essentially cylindrical bore 32 and a larger essentially cylindrical counter bore 34, within which the elongated core pin 50 is arranged. A lateral bore 36 extends radially outwardly from bore 32 into communication with a supply manifold 38, which delivers heated, flowable plastic material from an appropriate plasticizer, such as a continuous feed rotary screw plasticizer.

The die plate 40 is secured to the forward end of the extruder housing 30 by a plurality of radially arranged bolts 42 which are received within appropriately threaded bores, as shown in FIG. 6. A tapering bore 44 in the die plate aligns with bore 32 to provide a passageway for the flowable thermo-plastic material. At the other end of the tapering bore 44, the die includes a generally key-hole configured extrusion orifice 44, corresponding in size and shape to the extruded welt illustrated in FIGS. 1 and 2.

The core pin may be formed, for example, of tool steel and includes a rear mounting flange 51, an enlarged boss 52, an essentially elongated cylindrical portion 53, and a tapering nose portion 54 having flat lands 55. As shown in FIGS. 4 and 5, the mounting flange 51 is secured to the rear portion of the extruder housing 30 by a plurality of radially arranged bolts. The enlarged boss 52 closely seats within counterbore 34, serving to concentrically center the elongated portions 53 and 54 within the bore 32 and the tapering section 44 of the die plate, respectively. With the core pin thus positioned within the extruder cross head, an annular passageway 39 is formed, through which the plastic material from the supply manifold 38 flows toward the extrusion orifice 46. Of course, the passageway 39 is truly annular in the region of core pin section 53, but tapers within the die plate 40 as it tapers toward the key-hole configuration of the die orifice 46.

The core pin also includes an elongated, key-hole shaped guide way 56 throughout its length for guiding the composite preform, i.e., the reinforcing rod and fabric scrim, to the extrusion orifice 46. As shown in FIGS. 4 and 5, the mounting flange may include an optional, outwardly flaring passageway entrance 57 to facilitate the insertion of the composite preform into the longitudinal passageway 56. Additionally, the passageway 56 may taper in size from the outwardly flaring opening 57 to the opposite end of the core pin adjacent the extrusion orifice 46, as can be seen by comparing FIGS. 5, 6, and 7.

As will be appreciated, the method of forming the integral, composite welt prior to the embossing step is accomplished by feeding the fabric scrim wrapped around the polyethylene reinforcing rod through the elongated passageway 56 in the core pin 50. As the preform is fed through the core pin, the rod 16 is within the enlarged head portion of the opening and the fabric scrim is wrapped over the rod and drapes down into the reduced flange portion of the opening. Simultaneously, heated flowable thermoplastic material is fed into passageway 39 by the supply manifold 38. The heated plastic material flows completely around the composite preform as it exists the forward end of the core pin adjacent the extrusion orifice. Then the welt product is formed by extrusion as the plastic material and the encased preform exit through the key-hole shaped extrusion orifice 46.

After leaving the extruder cross head, the welt 10 is conveyed to a pair of spaced embossing rollers 60 and 70, as shown in FIG. 3, to sequentially emboss the sides of the welt, particularly the welt head 12.

Roller 60, which is identical to roller 70, is illustrated in detail in FIG. 8 and includes an annular, arcuate, groove 61 and a relatively flat, angular portion 62. As shown in FIG. 8, the head portion 12 of the welt is received in the arcuate groove 61, with the welt tail 14 lying flat against portion 62. Due to the nature of the welt product, the bead or head portion 12 is embossed with a grained surface and therefore the arcuate groove 61 includes a roughened, grained surface formed, for example, by etching. Optionally, the roughened surface may extend down onto a portion or onto all of flat portion 62 to provide a grained appearance to the welt tail 14. The roller 60 may be mounted in any desired manner for free rotation, such as upon a freely rotatable shaft 65 shown in FIG. 8.

In the embossing phase of the method, the welt is conveyed first into engagement with the roller 60, whereby the top half of the welt, as viewed in FIGS. 3 and 8, is placed in contact with the embossing peripheral surface of roller 60. As the welt engages the embossing surface 61, the roller rotates about its axis so that there is no relative movement between the welt and the embossing surface in order to achieve a well-defined embossment. During this same phase of embossment, only approximately one half of the arcuate surface of the welt head is embossed, as shown in FIG. 8. Preferably, the embossed groove 61 is slightly larger than one-half of the welt head 12, so that slightly more than half of the welt head is embossed as it passes in engagement with roller 60.

As shown in FIG. 3, the welt is conveyed around less than half of the circumference of the roller 60 and then conveyed in engagement with freely rotatable roller 70 where the other half of the welt is embossed. Again, the peripheral, annular groove on roller 70 is preferably larger than about half the peripheral surface on the welt head 12, so that the entire periphery of the welt head is embossed, in a slightly overlapping manner to assure that a longitudinal rib is not formed on the welt.

It will be appreciated that the foregoing description is exemplary in nature, rather than limiting, since the invention is limited only by the following claims. For example, the method has been described, for the most part, as including both the extrusion and embossing steps; those skilled in the art will readily appreciate that these two methods may be performed either in combination or separately.

Having therefore completely and sufficiently described my invention, I now claim:

1. The method of making a finishing welt, comprising the steps of:
    feeding a composite preform through an essentially key-hole shaped guide passage in a core pin of a cross head extruder, the preform including (a) a flexible reinforcing rod fed through the enlarged head portion of the passage and (b) a fabric scrim surrounding the rod and extending into the smaller tail portion of the passage;
    flowing heated plastic material over the composite preform as the preform exits from the core pin within the extruder cross head;
    then extruding the plastic material around the preform through an essentially key-hole configured die orifice in general alignment with the core pin passage and thereby forming a welt having a generally cylindrical head and a depending flange, wherein the head includes the flexible reinforcing rod surrounded by a fabric scrim and encased within an outer plastic covering and wherein the scrim extends into the flange for renforcement; and
    embossing a pattern onto the outer surface of the welt head by (a) conveying the welt under tension, while the plastic material of the welt is still deformable by virtue of residual heat from extrusion, over the roughened surface of a first roller and embossing at least slightly more than half the outer circumference of the welt head, the welt being wrapped at least partially around the first roller as it comes into contact therewith and as a result being conveyed away from the first roller along an axis different from that along which the welt first engages the first roller, and then (b) conveying the welt under tension over the roughened surface of a second roller and embossing slightly more than half the outer circumference of the welt head, including the previously unembossed portion, and overlapping a portion of the embossment formed by the first roller with the embossment formed by the second roller.

2. In a method of making an extruded plastic article having an embossed arcuate surface, the steps of:
    extruding an elongated plastic article through a die orifice having a generally arcuate segment and thereby forming a correspondingly shaped portion on the article;
    conveying the extruded plastic article away from the die orifice under tension along a first longitudinal axis which is tangent to a peripheral surface of a first rotatable, essentially cylindrical embossing surface having a roughened, arcuate peripheral portion;
    embossing at least half of the arcuate circumference on the plastic product by (a) conveying said portion of the arcuate circumference into engagement with the roughened arcuate portion of the first rotatable embossing surface and (b) conveying the plastic article along a partial circumferential path in engagement with the first rotatable embossing surface;

conveying the plastic article away from the first rotatable embossing surface along a second longitudinal axis (a) which forms an acute angle with the first longitudinal axis and (b) which is tangent to a peripheral surface of said first rotatable embossing surface and to a second rotatable, essentially cylindrical embossing surface having a roughened arcuate peripheral portion;

embossing the remaining portion of the arcuate circumference of the plastic article by (a) conveying said remaining portion of the arcuate circumference into engagement with the roughened arcuate portion of the second rotatable embossing surface, the area of engagement between the arcuate surface of the plastic article and said roughened arcuate portion of said second rotatable embossing surface extending sufficiently to overlap at least a portion of the arcuate circumference which was embossed by said first rotatable embossing surface, and (b) conveying the plastic article along a partial circumferential path in engagement with the second rotatable embossing surface and;

conveying the plastic article away from the second rotatable embossing surface along a third longitudinal axis (a) which forms an acute angle with said second longitudinal axis and (b) which is tangent to the peripheral surface of said second rotatable embossing surface.

3. The method as defined in claim 2, characterized by said third longitudinal axis being essentially parallel to the first longitudinal axis.

4. Embossing an outer arcuate surface of an elongated plastic article, by performing the following steps while the article is in a heated, deformable condition:

embossing at least slightly more than one-half of the elongated arcuate surface of the article by (a) conveying approximately one-half of the arcuate portion of the article into engagement with an annular, roughened, arcuate groove on a first rotatable roller, the groove corresponding in shape and size to at least slightly more than one-half of the arcuate portion of the article, and (B) conveying the article along a portion of a circumferential path while rotating the roller and maintaining said one-half of the arcuate surface in engagement with the groove on said first roller;

conveying the article away from the first roller, with slightly more than one-half of the surface on the arcuate portion being embossed; and then embossing the remainder of the arcuate portion of the article by (a) conveying slightly more than the other one-half of the arcuate portion of the article into engagement with an annular roughened, arcuate groove on a second rotatable roller, and (b) conveying the article along a portion of a circumferential path while rotating the second roller and maintaining said other one half of the cylindrical surface in engagement with the groove on said second roller, and (c) at least slightly overlapping the embossment from the second roller with the embossment from the first roller.

5. A method of continuously embossing the outer surface of an essentially cylindrical portion of an elongated plastic article, comprising the steps of:

conveying said plastic article away from an extrusion orifice under tension into engagement with two spaced, rotatable rollers having essentially identical annular, roughened embossing grooves, and sequentially embossing the opposed, essentially semi-cylindrical surfaces of the articles as one of the opposed semi-cylindrical surfaces is conveyed into engagement with the roughened embossing groove on the first of said rollers and then, as the other of the opposed semi-cylindrical surfaces is conveyed into engagement with the roughened embossing groove on the other of said rollers, said embossing grooves being so shaped and dimensioned as to result in overlapping of the embossment performed by each of the two rollers in the region where the two embossed semi-cylindrical surfaces are adjacent.

* * * * *